(12) United States Patent
Nanaumi et al.

(10) Patent No.: US 7,195,838 B2
(45) Date of Patent: Mar. 27, 2007

(54) MEMBRANE ELECTRODE ASSEMBLY AND FUEL CELL

(75) Inventors: Masaaki Nanaumi, Utsunomiya (JP); Junichi Yano, Utsunomiya (JP); Yoshihiro Nakanishi, Kawachi-gun (JP); Tadashi Nishiyama, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/232,085

(22) Filed: Aug. 29, 2002

(65) Prior Publication Data

US 2003/0049518 A1   Mar. 13, 2003

(30) Foreign Application Priority Data

Aug. 29, 2001   (JP) ............... 2001-260240

(51) Int. Cl.
*H01M 2/00* (2006.01)
*H01M 2/08* (2006.01)
*H01M 4/00* (2006.01)

(52) U.S. Cl. ............... 429/44; 429/34; 429/36

(58) Field of Classification Search ............ 429/34, 429/36, 40, 44
See application file for complete search history.

(56) References Cited

U.S. PATENT DOCUMENTS

| 5,176,966 A | 1/1993 | Epp et al. ............ 429/26 |
| 5,270,132 A * | 12/1993 | Breault et al. ............ 429/35 |
| 5,464,700 A | 11/1995 | Steck et al. |
| 6,692,860 B2 * | 2/2004 | Inoue et al. ............ 429/35 |
| 2002/0012822 A1 * | 1/2002 | Oyanagi et al. ............ 429/13 |

FOREIGN PATENT DOCUMENTS

| DE | 198 15 796 A1 | 10/1999 |
| EP | 1 152 477 A2 | 7/2001 |

* cited by examiner

*Primary Examiner*—Dah-Wei Yuan
(74) *Attorney, Agent, or Firm*—Lahive & Cockfield, LLP; Anthony A. Laurentano, Esq.

(57) ABSTRACT

In order to provide a membrane electrode assembly and a fuel cell in which the thickness of the solid polymer electrolyte membrane is thin by enhancing self-protection of the solid polymer electrolyte membrane, a membrane electrode assembly comprises a solid polymer electrolyte membrane and a pair of gas diffusion electrode layer having catalyst layers and gas diffusion layers. The catalyst layers of the gas diffusion electrode layer sandwich the solid polymer electrolyte membrane, one surface of the solid polymer electrolyte membrane is covered by the gas diffusion electrode layer and the other surface of the solid polymer electrolyte membrane extends over the gas diffusion electrode layer, and ends of the catalyst layer of one gas diffusion electrode layer are disposed to be offset to ends of the catalyst layer of the other gas diffusion electrode layer.

15 Claims, 6 Drawing Sheets

MEMBRANE ELECTRODE ASSEMBLY AND FUEL CELL

BACKGROUND OF THE INVENTION

1. Field of the Invention

The present invention relates to a membrane electrode assembly having a pair of gas diffusion electrode layers on each side of a solid polymer electrolyte membrane, and a fuel cell having the membrane electrode assembly sandwiched by a pair of separators. In particular, the present invention relates to a membrane electrode assembly or a fuel cell having a solid polymer electrolyte membrane extending over one gas diffusion electrode layer.

2. Description of Related Art

Some types of fuel cell have a structure in which a fuel cell unit comprises a membrane electrode assembly which is sandwiched by a pair of separators, and a plurality of the fuel cell units are stacked.

An example of such a membrane electrode assembly is explained with reference to FIG. 9. In the drawing, a reference numeral 1 indicates a membrane electrode assembly. The membrane electrode assembly 1 comprises a solid polymer electrolyte membrane 2 and gas diffusion electrode layers 3 and 4 (an anode gas diffusion electrode layer 3, a cathode gas diffusion electrode layer 4) which are disposed on both sides of the solid polymer electrolyte membrane 2. In the gas diffusion electrode layers 3 and 4, catalyst layers 5 and 6, and gas diffusion layers 7 and 8 are formed. The catalyst layers 5 and 6 contact both sides of the membrane electrode assembly 2. As shown in FIG. 9, the planar dimension of the solid polymer electrolyte membrane 2 is larger than the planar dimension of the gas diffusion electrode layers 3 and 4 disposed on both sides of the solid polymer electrolyte membrane 2. A portion of the solid polymer electrolyte membrane 2 extends to an outer circumferential region of the gas diffusion electrode layers 3 and 4. On both sides of the membrane electrode assembly 1 having such a structure, a pair of separators (not shown in the drawing) are disposed. Ring-shaped sealing members (not shown in the drawing) are disposed near a peripheral portion of the separator facing each other; thus, a fuel cell unit is formed.

In the fuel cell unit having such a structure, when a fuel gas (for example, a hydrogen gas) is supplied to a reactant surface of the above-mentioned anode gas diffusion electrode layer 3, hydrogen is ionized in a catalyst layer 5 of the anode gas diffusion electrode layer 3 so as to be transmitted to a catalyst layer 6 of a cathode gas diffusion electrode layer 4 via a solid polymer electrolyte membrane 2. An electron which is generated during such a transmission is extracted to the outside of the membrane electrode assembly and is utilized as a direct current electric energy. An oxidizing gas (for example, air containing oxygen) is supplied to the cathode gas diffusion electrode layer 4; thus, a hydrogen ion, an electron, and oxygens react so as to generate water.

Examples of other type of membrane electrode assembly are shown in FIGS. 10 and 11. In a membrane electrode assembly 1 shown in FIG. 10, a solid polymer electrolyte membrane 2 and gas diffusion electrode layers 3 and 4 are formed in the same size having the same ends and layered (See U.S. Pat. No. 5,176,966). In a membrane electrode assembly 1 shown in FIG. 11, gaskets 10 and 11 are disposed between the solid polymer electrolyte membrane 2 and the gas diffusion electrode layers 3 and 4 so as to seal end portions of the solid polymer electrolyte membrane 2 by the gaskets 10 and 11 (See U.S. Pat. No. 5,464,700).

However, conventional membrane electrode assembly has the following problems.

Recently, it is demanded that the sizes of a fuel cells be reduced. In order to supply such a fuel cell, thickness of a solid polymer electrolyte membrane in a membrane electrode assembly tends to be thinner. When thickness of a solid polymer electrolyte membrane 2 in a membrane electrode assembly 1 shown in FIG. 1 is reduced, there is a concern that strength of a portion of the solid polymer electrolyte membrane 2 which extends over gas diffusion electrode layers 3 and 4 may decrease.

Furthermore, in a membrane electrode assembly 1 shown in FIG. 9, a solid polymer electrolyte membrane 2 receives stress from the outer circumferential end of catalyst layers 5 and 6 to the same regions on both sides of the solid polymer electrolyte membrane 2; thus, there is a concern that excessive stress occurs thereon.

Also, in a membrane electrode assembly 1 shown in FIG. 10, both ends of the gas diffusion electrode layers 3 and 4 which are disposed on both sides of the solid polymer electrolyte membrane 2 coincide both ends of the solid polymer electrolyte membrane 2. Thus, reactant gases which are supplied to the gas diffusion electrode layers 3 and 4 tend to diffuse to the outside thereof. Therefore, there is a concern that the reactant gases may be mixed near the ends of the gas diffusion electrode layers 3 and 4. Furthermore, there is a concern that the ends of the gas diffusion electrode layers 3 and 4 are so close that short circuiting will occur.

Also, in a membrane electrode assembly 1 shown in FIG. 11, gaskets 10 and 11 are disposed near an end region between the gas diffusion electrode layers 3 and 4 and the solid polymer electrolyte membrane 2; therefore, thickness of the end region increases. Also, the gas diffusion electrode layers 3 and 4 is bent and loses flatness due to contacting the gaskets 10 and 11. Thus, manufacturing process of the membrane electrode assembly 1 becomes complicated because a countermeasures must be taken to maintain flatness.

An object of the present invention is to provide a membrane electrode assembly and a fuel cell in which the thickness of the solid polymer electrolyte membrane is thin by enhancing self-protection of the solid polymer electrolyte membrane.

SUMMARY OF THE INVENTION

In order to solve above-mentioned problems, a first aspect of the present invention is characterized in that a membrane electrode assembly (for example, a membrane electrode assembly 20 in embodiments to be mentioned later) comprises:

a solid polymer electrolyte membrane (for example, solid polymer electrolyte membrane 22); and a pair of gas diffusion electrode layers (for example, gas diffusion electrodes 24, 26) having catalyst layers (for example, catalyst layers 28 and 30 in embodiments to be described later) and gas diffusion layers (for example, gas diffusion layers 32 and 34 in embodiments to be described later); wherein the catalyst layers of the gas diffusion electrode layer sandwich the solid polymer electrolyte membrane;

one surface of the solid polymer electrolyte membrane is covered by the gas diffusion electrode layer (for example, a cathode gas diffusion electrode layer 26) and the other surface of the solid polymer electrolyte membrane extends over the gas diffusion electrode layer (for example, an anode gas diffusion electrode layer 24);

ends of the catalyst layer of one gas diffusion electrode layer are disposed to be offset to ends of the catalyst layer of the other gas diffusion electrode layer.

According to such a structure, even though a solid polymer electrolyte membrane 22 receives stress from the outer circumferential end of catalyst layers 28 and 30, the stress does not concentrate on the same regions on both sides of the solid polymer electrolyte membrane 22; thus, it is possible to diffuse the stress from both sides of the solid polymer electrolyte membrane. Therefore, it is possible to prevent the stress from concentrating at the solid polymer electrolyte membrane. Also, a surface of the solid polymer electrolyte membrane is covered with a gas diffusion electrode layer, therefore, it is possible to protect the solid polymer electrolyte membrane and to prevent the solid polymer electrolyte membrane from being damaged. Furthermore, ends of the gas diffusion electrode layers becomes distant from each of them; therefore, there is no concern that the reactant gases which are supplied to the gas diffusion electrode layers will mix near the ends of the gas diffusion electrode layers. Also, there is no concern that short circuiting will occur. Here, a catalyst layer may be disposed so as to be offset according to position of the other catalyst layer. The planar size of the catalyst layers may be of the same size, or may be of different sizes.

A second aspect of the present invention is characterized in that a membrane electrode assembly has a bonding layer (for example, a bonding layer 36 in embodiments to be described later) on outer circumferential regions of the catalyst layer (for example, a catalyst layer 30 in embodiments to be described later) of the gas diffusion electrode layer covering the solid polymer electrolyte membrane, and the bonding layer covers a peripheral region of the solid polymer electrolyte membrane. By forming bonding layers, a solid polymer electrolyte membrane and gas diffusion electrode layers are united, and it is possible to increase the strength of the solid polymer electrolyte membrane in thickness direction by supporting the gas diffusion electrode layers. Therefore, it becomes easy to handle the solid polymer electrolyte membrane. Also, the bonding layer covers an inner catalyst layer; thus the bonding layer functions as a seal, and there is no concern that the reactant gases will mix. Here, it is acceptable that a bonding layer be formed on an outer peripheral catalyst of the other gas diffusion electrode layer.

A third aspect of the present invention is characterized in that ends of the catalyst layer of the gas diffusion electrode layer covering one surface of the solid polymer electrolyte membrane are disposed in an inner region relative to the ends of the other catalyst layer. According to such a structure, it is possible to form a bonding layer on the outside of the ends of a catalyst layer of the gas diffusion electrode layer covering a surface of the solid polymer electrolyte membrane. By doing this, a bonding layer is formed on a gas diffusion electrode layer so as to face an end of the other catalyst layer; thus, the intensity of the solid polymer electrolyte membrane increases in a position facing to the ends of the other catalyst layer. Therefore, it is possible to protect the solid polymer electrolyte membrane from the stresses applied from the ends of the other catalyst layer. In addition, the bonding layer is formed in a region of the catalyst layer which does not contribute to generating electric current, it is possible to maintain efficient power generation and minimize the usage of the expensive catalyst layer. Here, one catalyst layer should preferably be slightly smaller than the other catalyst layer.

A fourth aspect of the present invention is different from the first aspect of the present invention in that portions of the gas diffusion layer 34 facing to the bonding layer 36 in the first aspect are replaced by a frame-shaped sealing member 62 (frame-shaped member). In the fourth aspect of the present invention, it is acceptable that the planar dimension of the gas diffusion layer 34 of the cathode gas diffusion electrode layer 26 be smaller than the planar dimension of the gas diffusion layer 32 of the anode gas diffusion electrode layer 24. By doing this, it is possible to maintain power generation efficiency at a similar level to the first aspect. Also, it is possible to decrease the usage of expensive gas diffusion layer 34; thus, it is possible to reduce the manufacturing cost of the membrane electrode assembly. Furthermore, there is an effect that it is possible to seal the gas diffusion layer 34 by the frame-shaped sealing member 62.

A fifth aspect of the present invention is different from the first to fourth aspects of the present invention in that a frame-shaped sealing member 72 which covers not only the outer circumference of the gas diffusion layer 34 of the cathode gas diffusion electrode layer 26 but also ends of a bonding layer 36 and a solid polymer electrolyte membrane 22 is provided. By doing this, it is possible to seal not only the gas diffusion layer 34 but also a catalyst layer 30 and the solid polymer electrolyte membrane 22 by the frame-shaped sealing member 72. Therefore, there is an effect that it is possible to prevent the reactant gases from mixing. In addition, there is an effect that it is possible to prevent moisture from evaporating from the ends of the solid polymer electrolyte membrane 22.

A sixth aspect of the present invention is characterized in that a fuel cell (for example, a fuel cell 90 in embodiments to be mentioned later) comprises:

a membrane electrode assembly according to any one of claims 1 to 5;

a pair of separators (for example, separators 82, and 84) for sandwiching the membrane electrode assembly;

a gas communication passage which is formed between the a pair of the separator and the membrane electrode assembly; wherein reactant (for example, fuel gas 87 and oxidizing gas 89 in embodiments to be described later) gases are supplied to the gas communication passage;

portions of the membrane electrode assembly which are extended over the gas diffusion electrode layer (24) are disposed so as to face each other on a near surface to the separator (for example, a separator 82 in embodiments to be mentioned later) to which a reactant gas having higher pressure than the other reactant gas is supplied. By doing this, a reactant gas having higher pressure than other reactant gases is supplied to portions of the solid polymer electrolyte membrane extending over the gas diffusion electrode layer. The reactant gas pushes the portions of the solid polymer electrolyte membrane extending over the gas diffusion electrode layer such that the solid polymer electrolyte membrane contacts the gas diffusion electrode layer covering the one surface of the solid polymer electrolyte membrane closely. Therefore, it is possible to prevent the solid polymer electrolyte membrane from being separated from the gas diffusion electrode layer.

As explained above, according to the first aspect of the present invention, the stresses from the end surfaces of the respective catalyst layers contacting the solid polymer electrolyte membrane do not concentrate at one point of the solid polymer electrolyte membrane, and the stress can be diffused from both surfaces of the solid polymer electrolyte membrane; therefore, it is possible to prevent the stress from concentrating to the solid polymer electrolyte membrane. Also, a surface of the solid polymer electrolyte membrane is covered by the gas diffusion electrode layer; therefore, it is possible to prevent the solid polymer electrolyte membrane from being damaged. Accordingly, it is possible to make the solid polymer electrolyte membrane thinner. Furthermore, because end surfaces of the respective gas diffusion electrode layers are distant, there is no concern that the reactant gases will be mixed in the end surfaces of the gas diffusion electrode layers. Also, there is no concern that short circuiting will occur.

According to the second aspect of the present invention, the solid polymer electrolyte membrane and the gas diffusion layers are united, and it is possible to reinforce the solid polymer electrolyte membrane in the thickness direction by supporting by the gas diffusion layers. Also, it becomes easy to handle the solid polymer electrolyte membrane; therefore, it is possible to make the solid polymer electrolyte membrane thinner. Also, the bonding layer functions as a seal for covering the inner catalyst layer; thus, it is possible to prevent the reactant gases from being mixed.

According to the third aspect of the present invention, it is possible to form the bonding layer in a position facing the end surfaces of the other catalyst layer in the gas diffusion electrode layer covering a surface of the solid polymer electrolyte membrane. Therefore, the solid polymer electrolyte membrane in the position can be reinforced. Accordingly, it is possible to protect the solid polymer electrolyte membrane from the stress applied from the end surfaces of the other catalyst layer. In addition, the bonding layer is formed in a portion which does not contribute to power generation in the catalyst layer; therefore, it is possible to maintain power generating efficiency and minimize the usage of the expensive catalyst layer. Thus, it is possible to make the solid polymer electrolyte membrane thinner.

According to the fourth aspect of the present invention, there are effects in that it is possible to maintain the power generating efficiency and decrease the usage of the expensive catalyst layer; therefore, it is possible to reduce the manufacturing cost of the solid polymer electrolyte membrane. Also, there is an effect that it is possible to seal the gas diffusion layer by the frame-shaped sealing member.

According to the fifth aspect of the present invention, it is possible to seal not only the gas diffusion layer but also the catalyst layers and the solid polymer electrolyte membrane by the frame-shaped sealing member. Therefore, there is an effect that it is possible to prevent the reactant gases from being mixed more desirably. In addition, there is an effect that it is possible to prevent the moisture from evaporating from the end surfaces of the solid polymer electrolyte membrane.

According to the sixth aspect of the present invention, the reactant gases push a portion of the surface of the solid polymer electrolyte membrane extending over the gas diffusion layer such that the solid polymer electrolyte membrane and the gas diffusion electrode layer covering a surface of the solid polymer electrolyte membrane contact closely. Therefore, it is possible to prevent the solid polymer electrolyte membrane from being removed from the gas diffusion electrode layer; therefore, it is possible to make the solid polymer electrolyte membrane thinner.

DETAILED DESCRIPTION OF THE INVENTION

Figure 1:
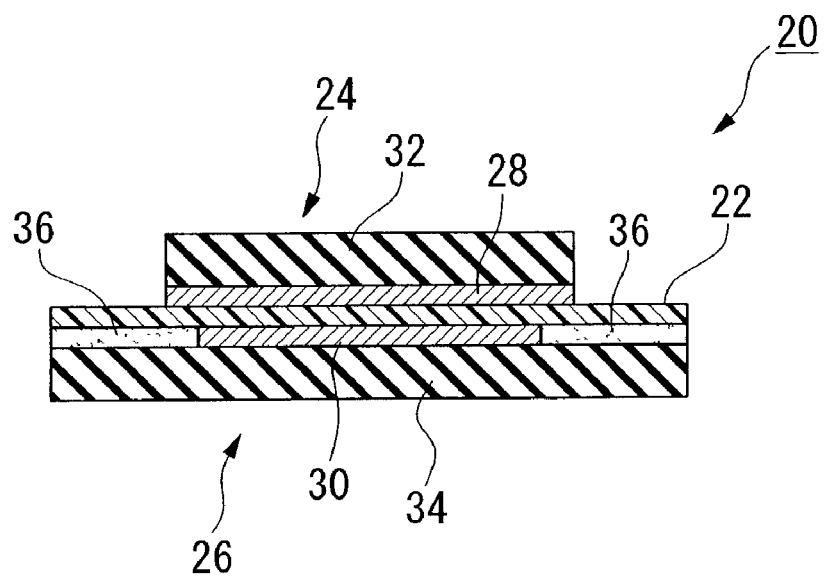
FIG. 1 is a cross section of a solid polymer electrolyte membrane according to a first embodiment of the present invention.

Embodiments of the membrane electrode assembly and fuel cell according to the present invention are explained with reference to the drawings as follows. FIG. 1 is a cross section of a membrane electrode assembly 22 according to a first embodiment of the present invention. A membrane electrode assembly 22 is provided with a solid polymer electrolyte membrane 22, an anode gas diffusion electrode layer 24 and a cathode gas diffusion electrode layer 26 disposed so as to sandwich the solid polymer electrolyte membrane 22. Catalyst layers 28 and 30, and gas diffusion layers 32 and 34 are formed on the anode gas diffusion electrode layer 24 and the cathode gas diffusion electrode layer 26. The catalyst layers 28 and 30 contacts both surfaces of the solid polymer electrolyte membrane 22. The main component of the catalyst layers 28 and 30 is platinum. The gas diffusion layers 32 and 34 are made from porous layer such as porous carbon cloth, or porous carbon paper. The solid polymer electrolyte membrane 22 are made of perfluorosulfonic acid polymer (fluorocarbonic polymers). Here, alternatively a member mainly made of hydrocarbon resin can be used for a solid polymer electrolyte membrane 22. Also, there is no limitation for a forming method for catalyst layers 28 and 30. It is acceptable that the catalyst layers 28 and 30 be formed by directly applying the catalyst paste or by vapor deposition of the catalyst on surfaces of the gas diffusion layers 32 and 34. Also, it is possible for the catalyst layers 28 and 30 to be formed by transferring the catalyst layer which is formed on a different member (such as film) on the solid polymer electrolyte membrane.

Figure 8:
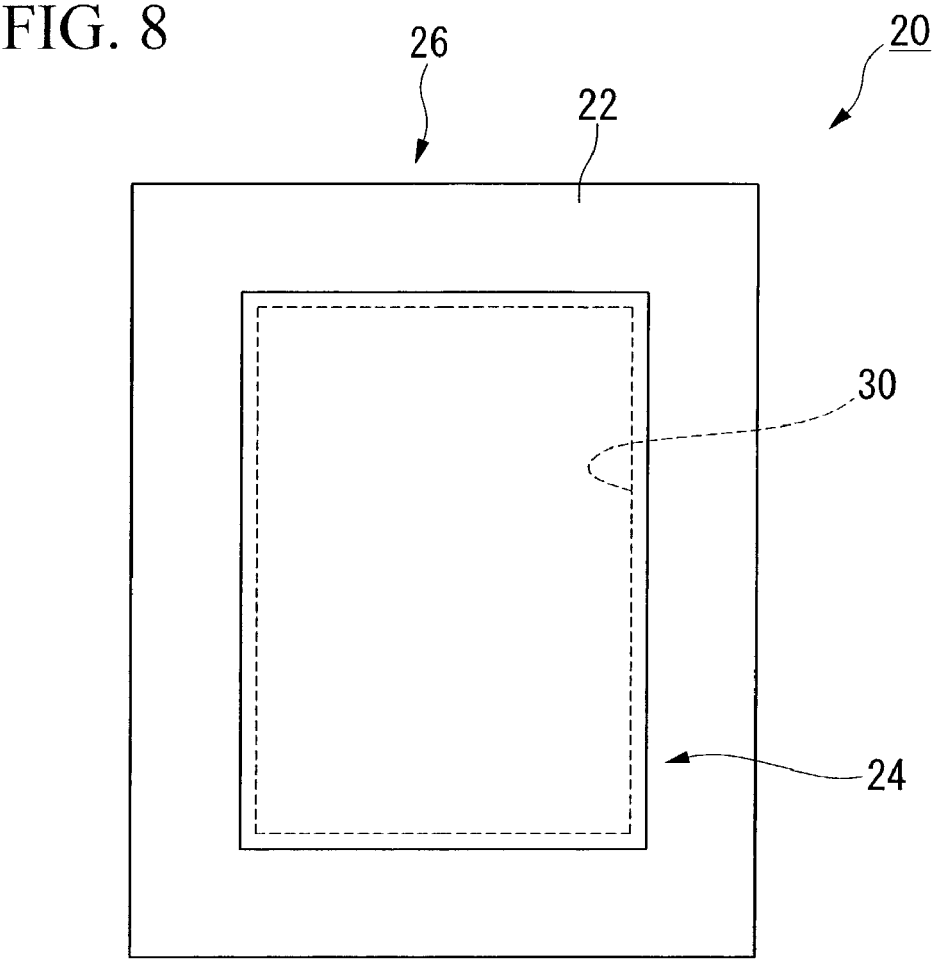
FIG. 8 is a plan view of the solid polymer electrolyte membrane according to the first embodiment of the present invention.
Figure 9:
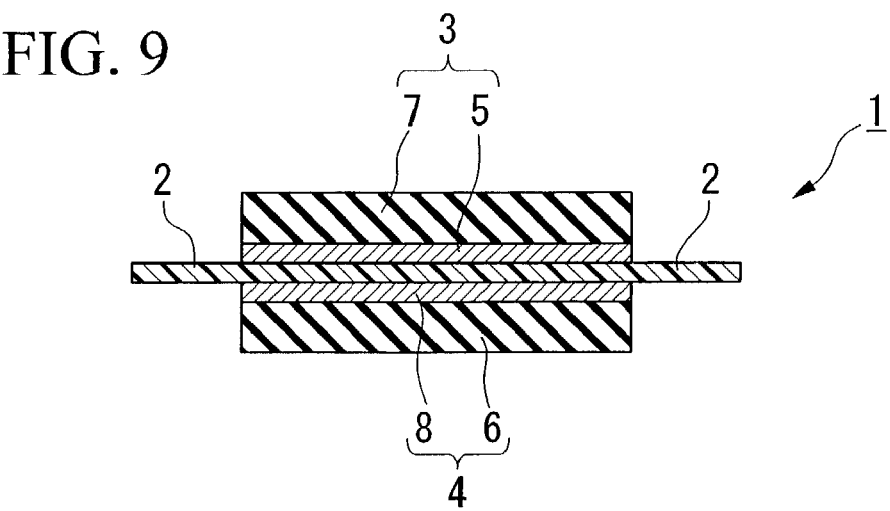
FIG. 9 is a cross section of a conventional solid polymer electrolyte membrane.
Figure 10:
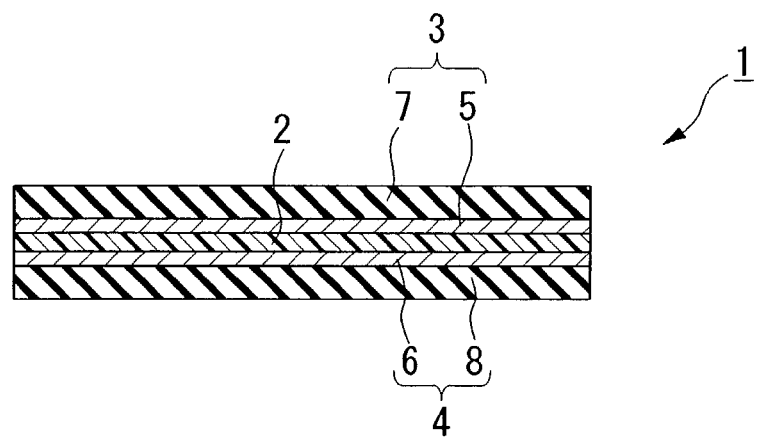
FIG. 10 is a cross section of a conventional solid polymer electrolyte membrane.
Figure 11:
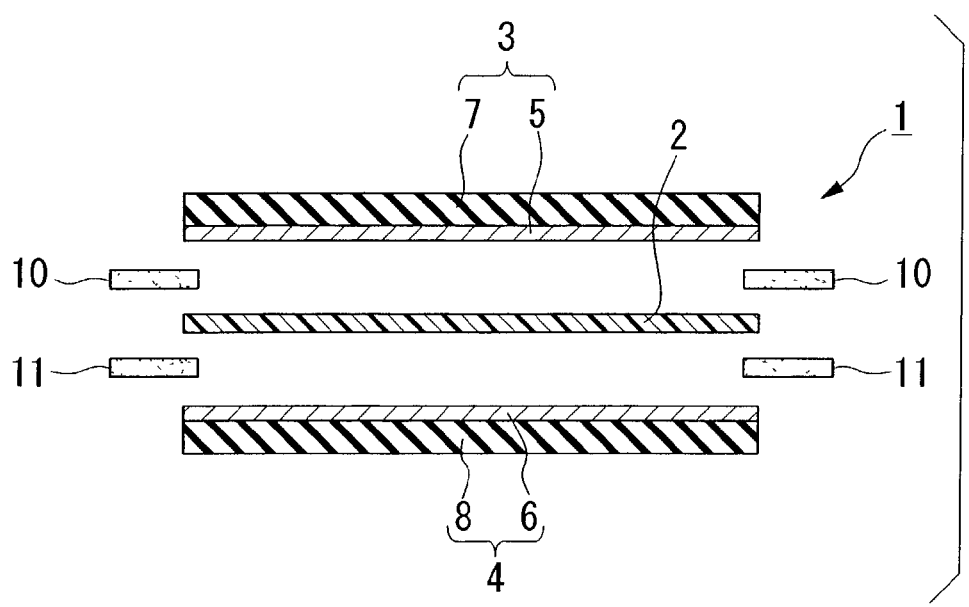
FIG. 11 is a cross section of a conventional solid polymer electrolyte membrane.

As shown in FIG. 8, a surface of the solid polymer electrolyte membrane 22 extends over the anode gas diffusion electrode layer 24, and the other surface of the solid polymer electrolyte membrane 22 is covered by the cathode gas diffusion electrode layer 26. In this way, the planar dimensions of the gas diffusion electrode layers 24 and 26 disposed on both surfaces of the solid polymer electrolyte membrane 22 are different from each other; thus, only one surface of the solid polymer electrolyte membrane 22 extends over a gas diffusion electrode layer. Thus, end surfaces of the gas diffusion electrode layers 24 and 26 are disposed having a certain distance via the solid polymer electrolyte membrane 22. By doing this, it is possible to prevent the reactant gases (fuel gas, oxidizer gas) which are to be supplied to the gas diffusion electrode layers 24 and 26 respectively from being mixed near the end surfaces of the solid polymer electrolyte membrane 22. Also, it is possible to prevent short circuiting. Also, a surface of the solid polymer electrolyte membrane 22 is covered by the cathode gas diffusion electrode layer 26; therefore, it is possible to prevent the solid polymer electrolyte membrane 22 from being damaged.

In the present embodiment, the planar dimensions of the catalyst layer 28 of the anode gas diffusion electrode layer 24 and the planar dimensions of the catalyst layer 30 of the cathode gas diffusion electrode layer 26 are different. Also, the position of the end surfaces of the catalyst layers are offset. By doing this, stresses from the catalyst layers 28 and 30 contacting the solid polymer electrolyte membrane 22 do not concentrate at one point; thus, it is possible to diffuse the stresses from both of the surfaces of the solid polymer electrolyte membrane. Therefore, it is possible to prevent the stress from concentrating at the solid polymer electrolyte membrane 22.

Also, the planar dimensions of the catalyst layer 30 of the cathode gas diffusion electrode layer 26 are smaller than the planar dimensions of the catalyst layer 28 of the anode gas diffusion electrode layer 24. A bonding layer 36 is formed on an outer circumference of the catalyst layer 30, and the outer periphery of the solid polymer electrolyte membrane 22 is surrounded by the bonding layer 36. By disposing such a bonding layer 36, the solid polymer electrolyte membrane 22 and the cathode gas diffusion electrode layer 26 are united; thus, it is possible to reinforce the solid polymer electrolyte membrane 22 by the gas diffusion layers. Also, it becomes easy to handle the membrane electrode assembly. Also, the bonding layer 36 functions as a seal for covering the inner catalyst layer 30; thus, it is possible to prevent the reactant gas from being mixed with each other and prevent short circuiting. Furthermore, on the solid polymer electrolyte membrane 22, the bonding layer 36 is disposed so as to be in the same position in which the end surfaces of the catalyst layer 28 contact the solid polymer electrolyte membrane 22 on an opposite surface of the solid polymer electrolyte membrane 22. Therefore, it is possible to protect the solid polymer electrolyte membrane 22 from the stress from the end surface of the catalyst layer 28. Here, for a bonding agent, it is preferable to use a fluorine agent or a silicon agent.

Figure 2:
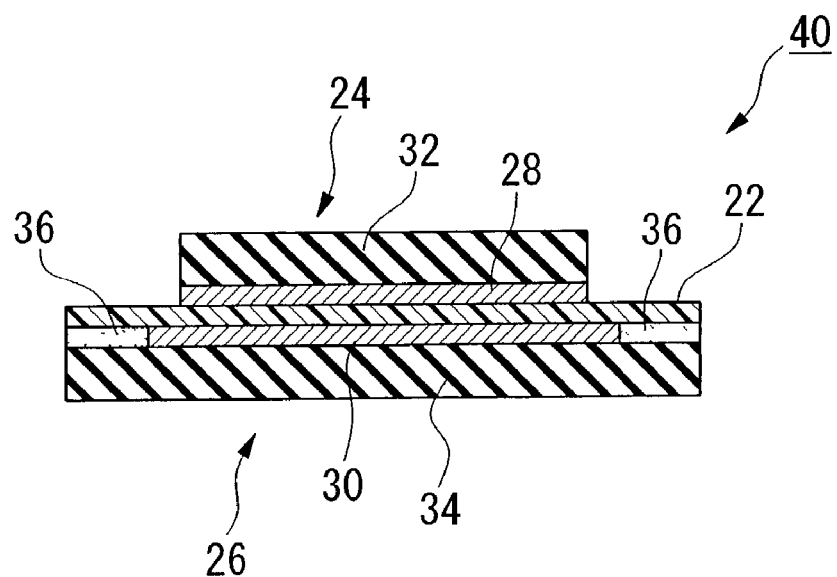
FIG. 2 is a cross section of a solid polymer electrolyte membrane according to a second embodiment of the present invention.

Next, a second embodiment of the solid polymer electrolyte membrane 22 according to the present invention is explained as follows. FIG. 2 is a cross section of a membrane electrode assembly 40 in the second embodiment of the present invention. Hereinafter, the same reference numerals are applied to corresponding members as shown in the first embodiment so as to omit the repeated explanation thereof. The present embodiment is different from the first embodiment in that the end surfaces of the catalyst layer 30 of the cathode gas diffusion electrode layer 26 covering a surface of the solid polymer electrolyte membrane 22 are disposed outside of the end surfaces of the other catalyst layer 28. By doing this, it is possible to maintain an adhering effect in an outer peripheral region of the solid polymer electrolyte membrane 22 at a high level. Also, similarly to the case of the first embodiment, it is possible to reduce the possibility that the reactant gases (fuel gas, oxidizer gas) to be mixed near the end surfaces of the solid polymer electrolyte membrane 22. It is possible to prevent short circuiting. Also, it is possible to prevent the solid polymer electrolyte membrane 22 from being damaged. In addition, the stresses from the end surfaces of the catalyst layers 28 and 30 contacting the solid polymer electrolyte membrane 22 respectively do not concentrate at one point; thus, the stress is diffused from both of the surfaces of the solid polymer electrolyte membrane 22. Therefore, it is possible to prevent the stresses from concentrating at the solid polymer electrolyte membrane 22.

Figure 3:
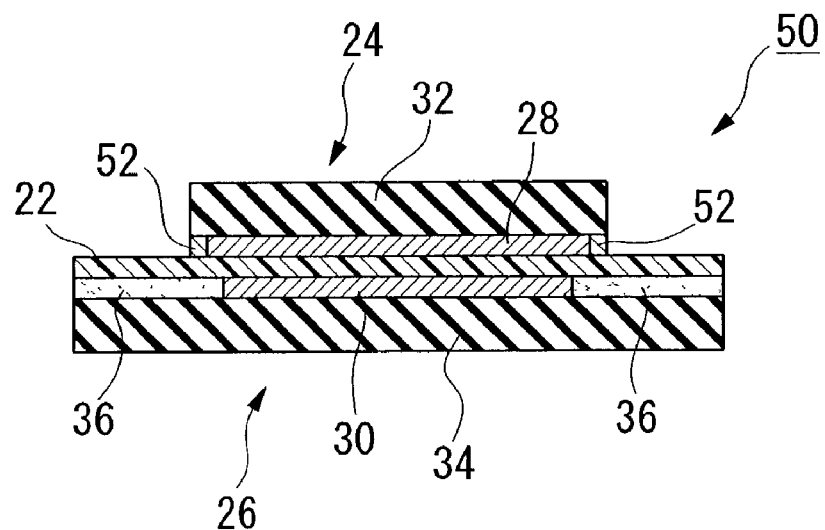
FIG. 3 is a cross section of a solid polymer electrolyte membrane according to a third embodiment of the present invention.

Next, a third embodiment of the membrane electrode assembly according to the present invention is explained as follows. FIG. 3 is a cross section of a membrane electrode assembly 50 in the third embodiment according to the present invention. The present embodiment is different from the above-mentioned embodiments in that a bonding layer 36 is formed at the outer circumference of the catalyst layer 30 of the cathode gas diffusion electrode layer 26, and a bonding layer 52 is also formed at the outer circumference of the catalyst layer 28 of the anode gas diffusion electrode layer 24. By doing this, there are effects that it is possible to enhance the adhering force of the solid polymer electrolyte membrane 22 and the cathode gas diffusion electrode layer 26 by the bonding layer 36, and it is possible to enhance the adhering force of the solid polymer electrolyte membrane 22 and the anode gas diffusion electrode layer 24 by the bonding layer 52. As it is similar to the case of the first embodiment, it is possible to reduce the concern that the reactant gases (fuel gas, oxidizer gas) will be mixed near the end surfaces of the solid polymer electrolyte membrane 22. Also, it is possible to prevent short circuiting. Also, it is possible to prevent the solid polymer electrolyte membrane 22 from being damaged. In addition, the stress from the end surfaces of the catalyst layers 28 and 30 contacting the solid polymer electrolyte membrane 22 respectively do not concentrate at one point; thus, the stress is diffused from both of the surfaces of the solid polymer electrolyte membrane 22. Therefore, it is possible to prevent the stress from concentrating at the solid polymer electrolyte membrane 22.

In the above-mentioned embodiments, explanation was made for the case in which the planar dimensions of the cathode gas diffusion electrode layer 26 are larger than the planar dimensions of the anode gas diffusion electrode layer 24. However, the specific structural and functional details disclosed herein are merely representative and do not limit the scope of the invention. Thus, it is acceptable for the planar dimensions of the anode gas diffusion electrode layer 24 to be larger than the planar dimensions of the cathode gas diffusion electrode layer 26.

Figure 4:
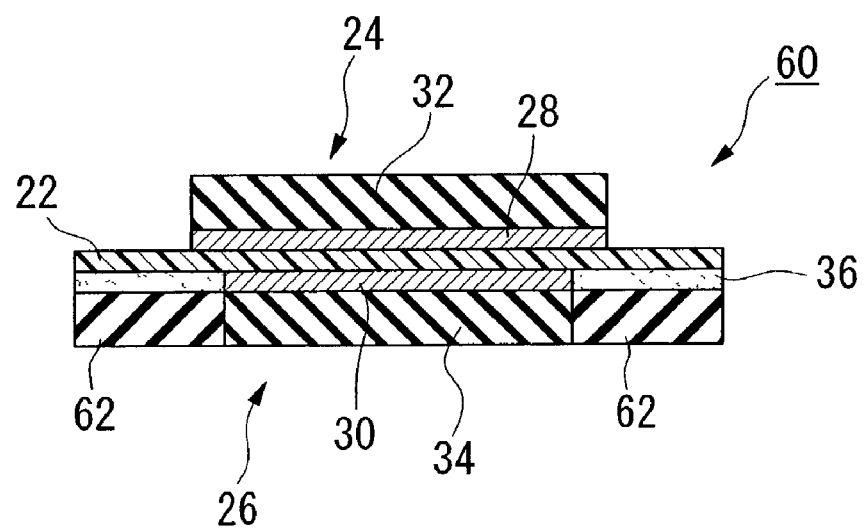
FIG. 4 is a cross section of a solid polymer electrolyte membrane according to a fourth embodiment of the present invention.

Next, a fourth embodiment of the membrane electrode assembly according to the present invention is explained as follows. FIG. 4 is a cross section of a membrane electrode assembly 60 in the fourth embodiment according to the present invention. The present embodiment is different from the above-mentioned embodiments in that planar dimensions of the gas diffusion layer 34 of the cathode gas diffusion electrode layer 26 are smaller than the planar dimensions of the gas diffusion layer 32 of the anode gas diffusion electrode layer 24, and portions of the gas diffusion layer 34 facing the bonding layer 36 is replaced by a frame-shaped sealing member 62 (frame-shaped member). By doing this, there are effects in that it is possible to maintain power generation efficiency at a similar level to the above-mentioned embodiments, and it is possible to reduce the usage of expensive gas diffusion layer 34 for reducing the manufacturing cost of the membrane electrode assembly. Furthermore, there is an effect that it is possible to seal the gas diffusion layer 34 by the frame-shaped sealing member 62. Also, as mentioned in the case of the first embodiment, it is possible to reduce the probability that the reactant gases (fuel gas, oxidizing gas) will be mixed near the end surfaces of the solid polymer electrolyte membrane 22. Also, it is possible to prevent short circuiting. Also, it is possible to prevent the solid polymer electrolyte membrane 22 from being damaged. In addition, the stresses from the end surfaces of the catalyst layers 28 and 30 contacting the solid polymer electrolyte membrane 22 respectively do not concentrate at one point; thus, the stresses are diffused from both of the surfaces of the solid polymer electrolyte membrane 22. Therefore, it is possible to prevent the stresses from concentrating at the solid polymer electrolyte membrane 22.

Figure 5:
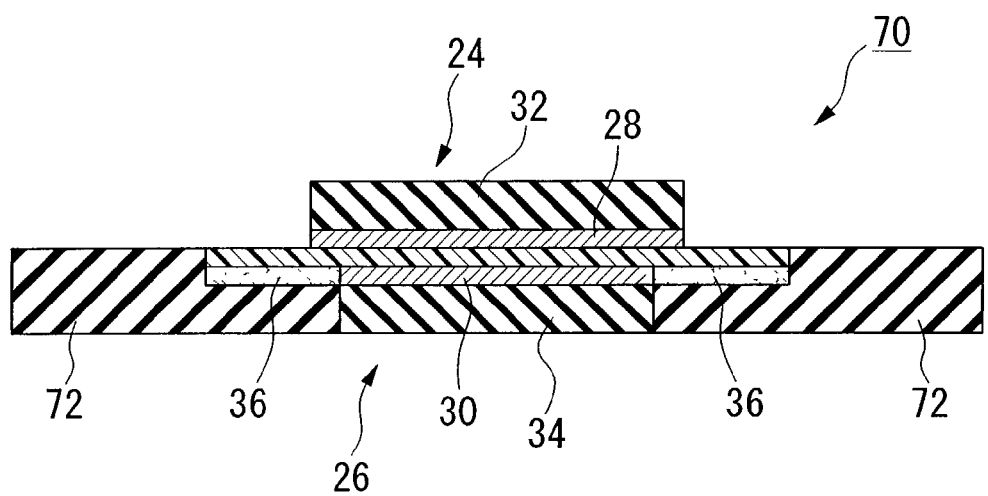
FIG. 5 is a cross section of a solid polymer electrolyte membrane according to a fifth embodiment of the present invention.

Next, a fifth embodiment of a membrane electrode assembly according to the present invention is explained. FIG. 5 is a cross section of a membrane electrode assembly 70 according to the fifth embodiment of the present invention. The present embodiment is different from the above-mentioned embodiments in that a frame-shaped sealing member 72 is provided so as to cover not only the gas diffusion layer 34 of the cathode gas diffusion electrode layer 26 but also the bonding layer 36 and the end surface of the solid polymer electrolyte membrane 22. By doing this, it is possible to seal not only the gas diffusion layer 34, but also the catalyst layer 30 and the solid polymer electrolyte membrane 22 by the frame-shaped sealing member 72; therefore, there is an effect in that it is possible to prevent the reactant gases from being mixed more than desired. In addition, there is an effect in that it is possible to prevent moisture from evaporating from the end surfaces of the solid polymer electrolyte membrane 22. As mentioned similarly in the explanation of the first embodiment, it is possible to reduce the possibility that the reactant gases (fuel gas, oxidizer gas) will be mixed near the end surfaces of the solid polymer electrolyte membrane 22. Also, it is possible to prevent short circuiting. Also, it is possible to prevent the solid polymer electrolyte membrane 22 from being damaged. In addition, the stresses from the end surfaces of the catalyst layers 28 and 30 contacting the solid polymer electrolyte membrane 22 respectively do not concentrate at one point; thus, the stress is diffused from both of the surfaces of the solid polymer electrolyte membrane 22. Therefore, it is possible to prevent the stresses from concentrating at the solid polymer electrolyte membrane 22.

Here, in the fifth embodiment, explanation was made for the case in which the planar dimensions of the cathode gas diffusion electrode layer 26 are smaller than the planar dimensions of the anode gas diffusion electrode layer 24. However, the specific structural and functional details disclosed herein are merely representative and do not limit the scope of the invention. Thus, it is acceptable that the planar dimensions of the anode gas diffusion electrode layer 24 be smaller than the planar dimensions of the cathode gas diffusion electrode layer 26. Also, it is acceptable for the catalyst layers 28 and 30 to be formed in the same size if positions of the end surfaces of the catalyst layers 28 and 30 are offset.

Figure 6:
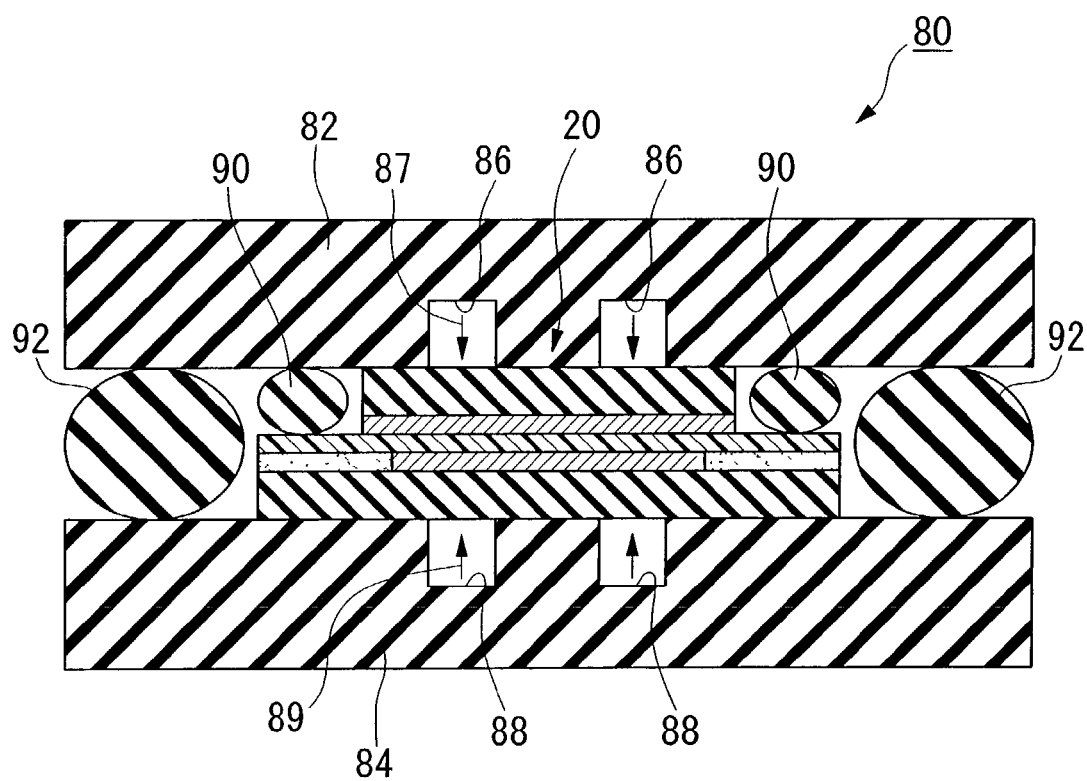
FIG. 6 is a cross section of a fuel cell using the solid polymer electrolyte membrane according to the first embodiment of the present invention.

A fuel cell using the above-mentioned membrane electrode assembly is explained below. FIG. 6 is a cross section of a fuel cell 80 using the membrane electrode assembly 20 according to the first embodiment of the present invention. The fuel cell 80 is provided with the membrane electrode assembly 20 and a pair of separators 82 and 84 for sandwiching the membrane electrode assembly 20. In the separators 82 and 84, a flow passage grooves 86 and 88 are formed for flowing the reactant gases respectively. In the present embodiment, a fuel gas (hydrogen) 87 is flowed in the flow passage groove 86 of the separator 82, and a oxidizing gas (air) 89 is flowed in the flow path groove 88 of the separator 84.

Pressure of the fuel gas 87 is set to be higher than the pressure of the oxidizing gas 88. By doing this, high pressure fuel gas 87 is supplied to a surface extending over the anode gas diffusion electrode layer 24 of the solid polymer electrolyte membrane 22, and the fuel gas 87 pushes the extended surface of the solid polymer electrolyte membrane 22. The solid polymer electrolyte membrane 22 itself is thin, and the solid polymer electrolyte membrane 22 extends and shrinks according to the moisture content thereinside; therefore, there is a possibility that the solid polymer electrolyte membrane 22 may be damaged unless modified as necessary. However, in the present embodiment, the fuel gas 87 pushes the extended surface such that the solid polymer electrolyte membrane 22 and the gas diffusion electrode layer 26 into close contact; therefore, it is possible to reinforce the solid polymer electrolyte membrane 22 and prevent the solid polymer electrolyte membrane 22 from being damaged.

Also, a seal member 90 is provided between a portion of the solid polymer electrolyte membrane 22 extending over the anode gas diffusion electrode layer 24 and the separator 82. A seal member 92 is provided between the separator 82 disposed outside of the seal member 90 and the separator 84. The seal members 90 and 92 have approximately circular cross section of; therefore, the seal members 90 and 92 are compressed (transformed in approximately oval shape) in a thickness direction when forming a fuel cell 80. Close contact of the seal members 90 and 92 increase; thus, high sealing performance can be realized.

Figure 7:
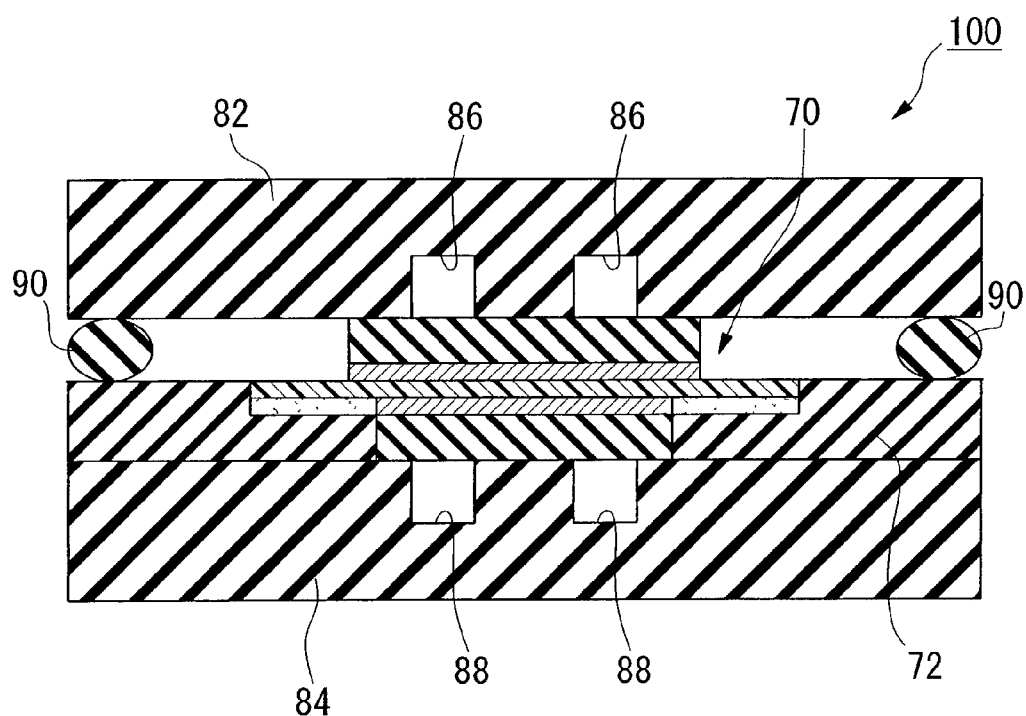
FIG. 7 is a cross section of a fuel cell using the solid polymer electrolyte membrane according to the fifth embodiment of the present invention.

Hereinafter, fuel cells having other structures are explained. FIG. 7 is a cross section of a fuel cell 100 using the membrane electrode assembly 70 according to the fifth embodiment of the present invention. In this case, by contacting the frame-shaped sealing member 72 to the seal member 90 closely, it is possible to seal the membrane electrode assembly 70 against the outside thereof. Also, the seal member 90 does not contact the solid polymer electrolyte membrane 22 closely, and a pushing force from the seal member 90 is not applied to the solid polymer electrolyte membrane 22; thus, it is possible to enhance the protection of the solid polymer electrolyte membrane 22 more reliably.

EXAMPLE

A membrane electrode assembly is produced as follows. Nafion 112 (Trademark of Dupont Inc.) is used for a solid polymer electrolyte membrane. A catalyst layer is produced as follows. That is, an ion conductive binder and a catalyst powder made of a carbon powder having platinum (Pt) thereon are mixed with a predetermined ratio; thus, a catalyst paste is produced. Screen printing of the catalyst paste is performed such that end surfaces are offset at predetermined positions on both surfaces of the solid polymer electrolyte membrane. After that, the catalyst paste is dried;

thus, the catalyst layers are formed on both surfaces of the solid polymer electrolyte membrane.

For a gas diffusion layer, a plate member made of a carbon paper is used. After a bonding agent is applied to a peripheral part of the gas diffusion layer, the gas diffusion layer is adhered to the solid polymer electrolyte membrane having the catalyst layer. Also, after the other gas diffusion layer is disposed at a predetermined position on the other surface of the solid polymer electrolyte membrane, hot press processing is performed at high temperature for a certain period of time; thus, the membrane electrode assembly is produced.

What is claimed is:

1. A membrane electrode assembly comprising:
   a solid polymer electrolyte membrane having two opposed surfaces, each surface being a single plane surface, wherein a thickness of the solid polymer electrolyte membrane is substantially uniform;
   a pair of gas diffusion electrode layers having catalyst layers and gas diffusion layers, and
   a bonding layer formed on an outer circumferential region of one of the catalyst layers of the pair of gas diffusion electrode layers covering the solid polymer electrolyte membrane, the bonding layer covering a peripheral region of the solid polymer electrolyte membrane, a border surface formed between the bonding layer and one of the catalyst layers being offset to a surface of an outer circumference of the other catalyst layer, wherein
   the catalyst layers of the gas diffusion electrode layers sandwich the solid polymer electrolyte membrane,
   one surface of the solid polymer electrolyte membrane is covered by one gas diffusion electrode layer and the other surface of the solid polymer electrolyte membrane extends over the other gas diffusion electrode layer, and
   ends of the catalyst layer of one gas diffusion electrode layer are disposed to be offset to ends of the catalyst layer of the other gas diffusion electrode layer.

2. A solid polymer electrolyte membrane according to claim 1, wherein ends of the catalyst layer of the gas diffusion electrode layer covering one surface of the solid polymer electrolyte membrane are disposed in an inner region relative to the ends of the other catalyst layer.

3. A fuel cell comprising
   a membrane electrode assembly according to claim 1;
   a pair of separators for sandwiching the membrane electrode assembly;
   a gas communication passage which is formed between the pair of the separators and the membrane electrode assembly; wherein
   reactant gases are supplied to the gas communication passage;
   portions of the membrane electrode assembly which are extended over the gas diffusion electrode layer are disposed such that:
   a reaction gas having higher pressure than the rest of the reaction gas is supplied to the separator; and
   a surface which extends over the gas diffusion electrode layer of the solid polymer electrolyte membrane is disposed so as to face the separators.

4. A catalyst layer of a membrane electrode assembly according to claim 1 which is obtained by performing a screen printing of a catalyst paste and drying the same, wherein the catalyst paste is made of an ion conductive binder and a catalyst grain made from a carbon grain containing platinum are mixed in a certain ratio.

5. A fuel cell comprising
   a membrane electrode assembly according to claim 1;
   a pair of separators for sandwiching the membrane electrode assembly;
   a gas communication passage which is formed between the pair of the separators and the membrane electrode assembly; wherein
   reactant gases are supplied to the gas communication passage;
   portions of the membrane electrode assembly which are extended over the gas diffusion electrode layer are disposed such that:
   a reaction gas having higher pressure than the rest of the reaction gas is supplied to the separator; and
   a surface which extends over the gas diffusion electrode layer of the solid polymer electrolyte membrane is disposed so as to face the separators.

6. A fuel cell comprising
   a membrane electrode assembly according to claim 2;
   a pair of separators for sandwiching the membrane electrode assembly;
   a gas communication passage which is formed between the pair of the separators and the membrane electrode assembly; wherein
   reactant gases are supplied to the gas communication passage;
   portions of the membrane electrode assembly which are extended over the gas diffusion electrode layer are disposed such that:
   a reaction gas having higher pressure than the rest of the reaction gas is supplied to the separator; and
   a surface which extends over the gas diffusion electrode layer of the solid polymer electrolyte membrane is disposed so as to face the separators.

7. A membrane electrode assembly according to claim 1 wherein ends of the catalyst layer of the gas diffusion electrode layer covering one surface of the solid polymer electrolyte membrane are disposed in an outer region relative to the ends of the other catalyst layer.

8. A membrane electrode assembly according to claim 1 further comprising:
   a bonding layer on an outer circumferential region of the catalyst layer of the gas diffusion electrode layer which is disposed on an opposite side of the gas diffusion electrode layer which covers the solid polymer electrolyte membrane.

9. A membrane electrode assembly according to claim 1 further comprising:
   a pair of separators for sandwiching the membrane electrode assembly;
   a seal member which is provided between a portion of the solid polymer electrolyte membrane extending over the anode gas diffusion electrode layer and the separator; and
   a seal member which is provided between the separator disposed outside of the seal member and the separator.

10. A membrane electrode assembly comprising:
    a solid polymer electrolyte membrane having two opposed surfaces, each surface being a single plane surface, wherein a thickness of the solid polymer electrolyte membrane is substantially uniform;
    a pair of gas diffusion electrode layers having catalyst layers and gas diffusion layers; and
    a bonding layer formed on an outer circumferential region of one of the catalyst layers of the pair of gas diffusion electrode layers covering the solid polymer electrolyte membrane, the bonding layer covering a peripheral region of the solid polymer electrolyte membrane, a border surface formed between the bonding layer and one of the catalyst layers being offset to a surface of an outer circumference of the other catalyst layer, wherein the catalyst layers of the gas diffusion electrode layers sandwich the solid polymer electrolyte membrane, one surface of the solid polymer electrolyte membrane is covered by one gas diffusion electrode layer and a frame-shaped sealing member which is disposed outside of the gas diffusion electrode layer, and the other surface of the solid polymer electrolyte membrane extends over the other gas diffusion electrode layer, and ends of the catalyst layer of one gas diffusion electrode layer are disposed to be offset to ends of the catalyst layer of the other gas diffusion electrode layer.

11. A membrane electrode assembly according to claim 10 wherein the frame-shaped sealing member is formed so as to cover the ends of the membrane electrode assembly.

12. A fuel cell comprising
a membrane electrode assembly according to claim 10;
a pair of separators for sandwiching the membrane electrode assembly;
a gas communication passage which is formed between the pair of the separators and the membrane electrode assembly; wherein
reactant gases are supplied to the gas communication passage;
portions of the membrane electrode assembly which are extended over the gas diffusion electrode layer are disposed such that:
a reaction gas having higher pressure than the rest of the reaction gas is supplied to the separator; and
a surface which extends over the gas diffusion electrode layer of the solid polymer electrolyte membrane is disposed so as to face the separators.

13. A fuel cell comprising
a membrane electrode assembly according to claim 11;
a pair of separators for sandwiching the membrane electrode assembly;
a gas communication passage which is formed between the pair of the separators and the membrane electrode assembly; wherein
reactant gases are supplied to the gas communication passage;
portions of the membrane electrode assembly which are extended over the gas diffusion electrode layer are disposed such that:
a reaction gas having higher pressure than the rest of the reaction gas is supplied to the separator; and
a surface which extends over the gas diffusion electrode layer of the solid polymer electrolyte membrane is disposed so as to face the separators.

14. A fuel cell having the membrane electrode assembly of claim 11 wherein:
the membrane electrode assembly is sandwiched by a pair of seperators which have passage grooves; and
a seal member is disposed between the separators which face a frame-shaped sealing member.

15. A membrane electrode assembly comprising:
a solid polymer electrolyte membrane;
a pair of gas diffusion electrode layers having catalyst layers and gas diffusion layers, and
a bonding layer formed on an outer circumferential region of one of the catalyst layers of the pair of gas diffusion electrode layers covering the solid polymer electrolyte membrane, the bonding layer covering a peripheral region of the solid polymer electrolyte membrane, a border surface formed between the bonding layer and one of the catalyst layers being offset to a surface of an outer circumference of the other catalyst layer, wherein
the catalyst layers of the gas diffusion electrode layers sandwich the solid polymer electrolyte membrane,
one surface of the solid polymer electrolyte membrane is covered by one gas diffusion electrode layer and the other surface of the solid polymer electrolyte membrane extends over the other gas diffusion electrode layer,
ends of the catalyst layer of one gas diffusion electrode layer are disposed to be offset to ends of the catalyst layer of the other gas diffusion electrode layer, and
ends of the gas diffusion layer of one gas diffusion electrode layer are disposed to be offset to ends of the gas diffusion layer of the other gas diffusion electrode layer.

* * * * *